(12) United States Patent
Orr (10) Patent No.: US 8,122,234 B1
(45) Date of Patent: Feb. 21, 2012

(54) FLASH MEMORY BACKUP SYSTEM FOR NETWORK DEVICES

(75) Inventor: Michael Orr, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 852 days.

(21) Appl. No.: 11/893,543

(22) Filed: Aug. 16, 2007

Related U.S. Application Data (60) Provisional application No. 60/823,203, filed on Aug. 22, 2006.

(51) Int. Cl.
*G06F 9/00* (2006.01)
*G06F 15/177* (2006.01)

(52) U.S. Cl. ............ 713/2; 713/1; 714/100; 714/2; 714/6.12; 714/6.31; 714/54

(58) Field of Classification Search .......... 713/1, 2; 714/100, 2, 6, 54, 6.12, 6.31
See application file for complete search history.

(56) References Cited

U.S. PATENT DOCUMENTS

| | | | | |
|---|---|---|---|---|
| 6,826,710 | B2 * | 11/2004 | Merkin et al. ............... | 714/6.31 |
| 7,043,664 | B1 * | 5/2006 | Chiloyan ...................... | 714/5 |
| 7,136,994 | B2 * | 11/2006 | Zimmer et al. .............. | 713/2 |
| 7,188,278 | B1 * | 3/2007 | Diaz et al. ................... | 714/36 |
| 7,251,725 | B2 * | 7/2007 | Loison et al. ................ | 713/1 |
| 7,313,685 | B2 * | 12/2007 | Broyles et al. .............. | 713/2 |
| 7,318,151 | B1 * | 1/2008 | Harris ........................... | 713/2 |
| 7,334,121 | B2 * | 2/2008 | Lee ............................... | 713/2 |
| 7,802,084 | B2 * | 9/2010 | Fitzgerald et al. .......... | 713/2 |
| 2002/0099971 | A1 * | 7/2002 | Merkin et al. ............... | 714/6 |
| 2003/0028800 | A1 * | 2/2003 | Dayan et al. ................. | 713/200 |
| 2003/0046529 | A1 * | 3/2003 | Loison et al. ................ | 713/2 |
| 2004/0230788 | A1 * | 11/2004 | Zimmer et al. .............. | 713/2 |
| 2006/0020844 | A1 * | 1/2006 | Gibbons et al. ............. | 714/2 |
| 2006/0075276 | A1 * | 4/2006 | Kataria et al. ............... | 714/4 |
| 2006/0259754 | A1 * | 11/2006 | Miller et al. ................. | 713/1 |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 531 pages.

IEEE Std 802.11a-1999 (Supplement to IEEE Std 802.11-1999) [Adopted by ISO/IEC and redesignated as ISO/IEC 8802-11: 1999/ Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

(Continued)

*Primary Examiner* — Ji H Bae
*Assistant Examiner* — Jaweed A Abbaszadeh (57) ABSTRACT

A device includes a first memory with first and second memory segments. The first memory segment stores a full image file. A second memory segment stores a partial image file, which is a smaller file and has fewer features than the full image file. A second memory stores a boot program. A control module detects an error in the full image file and executes the boot program using the partial image file.

32 Claims, 4 Drawing Sheets

OTHER PUBLICATIONS

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11g/D2.8, May 2002 (Supplement to ANSI/IEEE Std 802.11, 1999 Edition) Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band; LAN/MAN Standards Committee of the IEEE Computer Society; 53 pages.

802.11n; IEEE P802.11-04/0889r6; Wireless LANs, TGn Sync Proposal Technical Specification; May 2005; 131 pages.

IEEE Std 802.16-2004 (Revision of IEEE Std 802.16/2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE 802.20-PD-06, IEEE P 802.20 V14, Jul. 16, 2004, Draft 802.20 Permanent Document, System Requirements for IEEE 802.20 Mobile Broadband Wireless Access Systems—Version 14, 23 pages.

\* cited by examiner

FLASH MEMORY BACKUP SYSTEM FOR NETWORK DEVICES

CROSS-REFERENCE TO RELATED APPLICATIONS

This application claims the benefit of U.S. Provisional Application No. 60/823,203, filed on Aug. 22, 2006. The disclosure of the above application is incorporated herein by reference in its entirety.

FIELD

The present disclosure relates to network-attached devices, and more particularly, to nonvolatile memory of network devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

During start-up of computing devices such switches, routers, computers and the like, a boot program is executed. The boot program is typically run from electrically erasable programmable read-only memory (EEPROM). The boot program takes an image file from flash memory, which has boot information, un-compresses the file and stores it in random access memory (RAM). The boot information may include communication protocols, web server information, and/or configuration information. Once loaded, the boot program instructs a central processing unit (CPU) to run the loaded image file and configure the computing device.

Problems can arise when the image file is corrupted, is an incorrect or incompatible image file, and/or when an updated image file downloading to the flash memory was improperly or incompletely executed. For example, when a user of the computing device upgrades to a new version of product firmware, a new image file is downloaded into flash memory. This is typically done by some form of file transfer. When a failure event occurs during the file transfer, such as a failure event due to a power outage, the user may end up with an incomplete and/or unusable file on the flash memory. This can prevent the electronic computing device from booting.

Without a proper compatible image file, the computing device may be inoperable and/or incapable of performing intended tasks. Some electronic devices have a physical interface, such as a RS-232 interface. The manufacturer may use the physical interface to download a new image file or other data. However, when the computing devices are not at the manufacturer's location, the hard-wired connection usage is cumbersome. As such, a client may need to ship the device back to the manufacturer or another facility for repair or request a technician to perform a "house call".

One technique that is used to provide a backup image file involves the use of two flash memories. Each flash memory has a copy of an image file. The second image file copy is used when problems occur with the first image file. The second image file allows for normal booting and downloading of a new image file. While improving reliability, cost is increased due the increased amount of flash memory. In other words, a higher manufacturing cost is incurred for a relatively rare event.

SUMMARY

In one embodiment, a device is provided that includes a first memory with first and second memory segments. The first memory segment stores a full image file. A second memory segment stores a partial image file, which is a smaller file and has fewer features than the full image file. A second memory stores a boot program. A control module detects an error in the full image file and executes the boot program using the partial image file.

In other features, the first memory includes flash memory. In other features, the first and second memory segments of the first memory are implemented by an integrated circuit.

In still other features, the partial image file has a portion of information included in the full image file.

In other features, the second memory segment includes Internet protocol (IP) address accessing code and file transfer protocol code. In other features, the second memory segment includes remote file transfer information.

In yet other features, the first memory includes a configuration database, wherein the control module configures a device based on the configuration database.

In other features, the control module receives an Internet protocol (IP) address via at least one of the partial image file, a user and a dynamic host configuration protocol (DHCP) server.

In further features, the control module generates an Internet protocol (IP) address request signal based on the partial image file, and receives an IP address from a dynamic host configuration protocol (DHCP) server based on the IP address request signal. In other features, the control module stores a default gateway identifier, and sends the IP address request signal based on the default gateway identifier.

In other features, the control module stores a default Internet protocol (IP) address associated with a default gateway, and wherein the control module receives an updated image file via the default IP address.

In still other features, the second memory includes read only memory. In other features, the second memory includes electrically erasable programmable read only memory.

In other features, a third memory is included and the control module uncompresses and stores the partial image file in the third memory. In other features, the third memory includes random access memory.

In yet other features, a serial interface is included and the control module receives an updated image file via the serial interface. In other features, a network interface is included and the control module receives an updated image file via the network interface.

In further features, the second memory includes validity check software. In other features, the control module verifies that at least one of the full image file and the partial image file are operable. In other features, the control module determines whether an error in the full image file is corrected. In other features, the control module determines whether the full image file is correct.

In other features, a switch is provided and includes the device.

In other features, a method of operating a device is provided and includes storing a full image file in a first memory segment of a first memory. A partial image file is stored in a second memory segment of the first memory. The partial image file is a smaller file and has fewer features than the full image file. A boot program is stored in a second memory. An error in the full image file is detected and the boot program is executed using the partial image file.

In still other features, the full image file and the partial image file are stored in a flash memory. In other features, the partial image file has a portion of information included in the full image file.

In other features, the second memory segment includes Internet protocol (IP) address accessing code and file transfer protocol code. In other features, the second memory segment includes remote file transfer information.

In yet other features, a device is configured based on a configuration database in the first memory.

In other features, an Internet protocol (IP) address is received via at least one of the partial image file, a user and a dynamic host configuration protocol (DHCP) server.

In further features, an Internet protocol (IP) address request signal is generated based on the partial image file. An IP address is received from a dynamic host configuration protocol (DHCP) server based on the IP address request signal. In other features, the control module stores a default gateway identifier, and sends the IP address request signal based on the default gateway identifier.

In other features, a default Internet protocol (IP) address associated with a default gateway is stored. An updated image file is received via the default IP address.

In still other features, the boot program is stored in a read only memory. In other features, the boot program is stored in an electrically erasable programmable read only memory.

In other features, the partial image file is uncompressed and stored in a third memory. In other features, the partial image file is uncompressed and stored in a random access memory.

In yet other features, an updated image file is received via a serial interface. In other features, an updated image file is received via a network interface.

In other features, the method includes verifying that at least one of the full image file and the partial image file are operable. In other features, the method includes determining whether an error in the full image file is corrected. In other features, the method includes determining whether the full image file is correct.

In further features, a device includes first storing means for storing image files. The first storing means includes first storing segment means for storing a full image file and second memory segment means for storing a partial image file. The partial image file is a smaller file and has fewer features than the full image file. The device further includes second storing means for storing a boot program. Control means for detecting an error in the full image file and for executing the boot program using the partial image file is also included.

In other features, the first storing means includes flash memory. In other features, the first and second storing segment means of the first storing means are implemented by an integrated circuit.

In still other features, the partial image file has a portion of information included in the full image file.

In other features, the second storing segment means includes Internet protocol (IP) address accessing code and file transfer protocol code. In other features, the second storing segment means includes remote file transfer information.

In yet other features, the first storing means includes a configuration database, wherein the control means configures a device based on the configuration database.

In other features, the control means receives an Internet protocol (IP) address via at least one of the partial image file, a user and a dynamic host configuration protocol (DHCP) server.

In further features, the control means generates an Internet protocol (IP) address request signal based on the partial image file, and receives an IP address from a dynamic host configuration protocol (DHCP) server based on the IP address request signal. In other features, the control means stores a default gateway identifier, and sends the IP address request signal based on the default gateway identifier.

In other features, the control means stores a default Internet protocol (IP) address associated with a default gateway, and wherein the control means receives an updated image file via the default IP address.

In still other features, the second storing means includes read only memory. In other features, the second storing means includes electrically erasable programmable read only memory.

In other features, the device includes third storing means for storing the partial image file when uncompressed by the control means. In other features, the third storing means includes random access memory.

In yet other features, the device includes serial interface means for receiving an updated image file by the control means. In other features, the device includes network interface means for receiving an updated image file by the control means.

In other features, the second storing means includes validity check software. In other features, the control means verifies that at least one of the full image file and the partial image file are operable. In other features, the control means determines whether an error in the full image file is corrected. In other features, the control means determines whether the full image file is correct.

In further features, a switch includes the device.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The embodiments disclosed herein may be applied to network-attached devices, or any device with operating software (basic input/output system (BIOS) or application level) that can be upgraded by transporting the updates to the device over a network.

Figure 1:
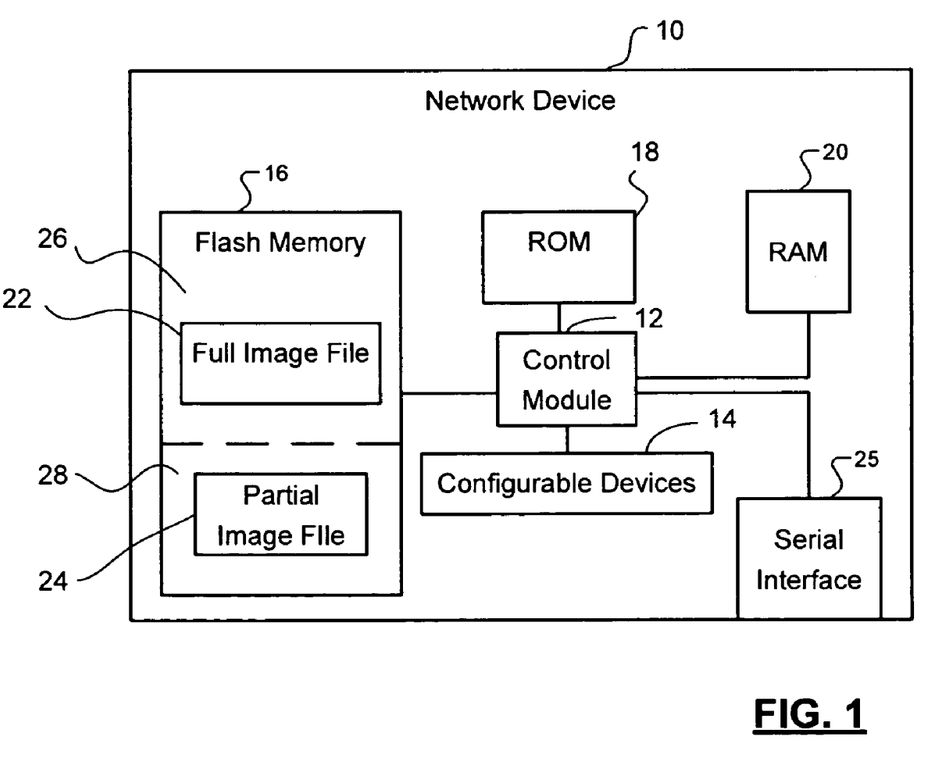
FIG. 1 is a functional block diagram of a network device according to an embodiment of the present disclosure.

Referring now to FIG. 1, a functional block diagram of a network device 10 is shown. The network device 10 includes a control module 12 that configures one or more configurable devices 14 during boot up. For example when silicon switches are configured, the switches carry out correction operations on frames of data that are encountered by the switches during normal operation. Switches forward frames to the correct (the calculated) egress interface. The main points of configuration of the switches affect how a calculation of a "correct" egress interface is performed. The switches also affect attributes of frame handling while in transit through the switch, e.g. how much resources to allow the frame to consume. The switches are also used to control communication between the switches and other switches and users. Attributes of the switches are configured, such as the initial phase of the switches and the interfaces in which they are to respond.

The control module 12 communicates with a first memory 16, a second memory 18 and a third memory 20. For example only, the first, second and third memories may be flash memory, read only memory (ROM) and random access memory (RAM), respectively. In use, the control module 12, using code in the second memory 18, pulls a full image file 22 or a partial image file 24 from the first memory 16 into the third memory 20. The full image file 22 or the partial image file 24 is expanded and executed to boot up the network device 10. The control module 12 may also communicate with a serial interface 25.

The first memory 16 may be implemented as a single memory integrated circuit (IC) and may be segmented. A first segment 26 may include the full image file 22. A second segment 28 may include the partial image file 24. The full image file 22 includes software and/or logic to configure, and/or operate the configurable devices 14. The partial image file 24 is a scaled down and thus smaller version of the full image file 22. The partial image file 24 has some of the features and information included in the full image file 22.

The full image file 22 and the partial image file 24 may be stored in compressed form in the first memory 16 to conserve space. The full image file 22 may contain boot information used by the control module 12 during boot up to configure the configurable devices 14. The full image file 22 may include IEEE protocols, IETF Protocols, web server information, switching/router information, manufacturer interfacing information, IP addressing information, file transfer information, etc.

While having a smaller capacity, the partial image file 24 may provide enough functionality to allow remote file loading. The partial image file 24 may include code and/or other information that allows IP addressing, the ability for the network device 10 to be remotely contacted, and/or file transfer to the network device 10. The partial image file 24 may include information that allows the control module 12 to run a trivial file transfer protocol (TFTP) or other file transfer protocols to allow for file transfer. The file transfer information at a minimum allows for the transfer of a current, operable, compatible and/or updated image file to replace the full image file 22. The partial image file 24 may include other information as described below with respect to the embodiment of FIG. 2.

Unlike the full image file 22, the partial image file 24 may omit certain types of files. For example only, the partial image file 24 may omit switch-to-switch or (network device)-to-(network device) traffic coordination code or information and user-to-switch or user-to-(network device) configuration code or information. For example only, the partial image file 24 may omit code or information that allows a user to configure the network device 10 and/or that allows the control module to indicate to a user when the network device 10 is configured. For example only, the partial image file 24 may also omit code or information that allows the control module 12 to indicate the number of users, to manage the quality of service and to monitor routing tables.

In one embodiment, the first memory 16 includes nonvolatile memory that may be electrically erased and reprogrammed. For example, the first memory 16 may include flash memory. The first memory 16 may be of various sizes and segmented differently depending upon the application. The second memory 18 may include ROM, as shown, or other suitable memory. The third memory 20 may include RAM, as shown, or other suitable memory.

The serial interface 25 may be a RETMA standard (RS)-232 serial interface, a universal serial port (USB) interface, or some other suitable interface. The serial interface 25 allows for a hard-wired connection directly between a network device and a manufacturer download system or the Internet. The serial interface 25 may be used to upload a current, acceptable, compatible and/or updated image file. This may be used to replace the full image file 22 and/or the partial image file 24.

Figure 2:
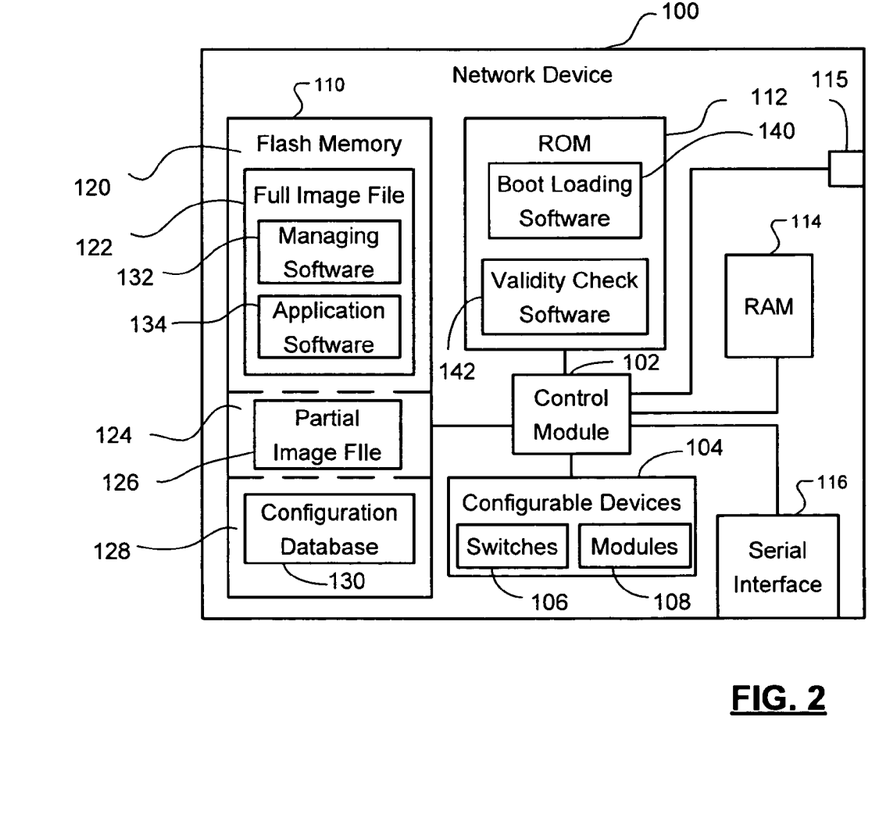
FIG. 2 is a functional block diagram of a network device according to another embodiment of the present disclosure.

Referring now to FIG. 2, a functional block diagram of a network device 100 is shown. The network device 100 includes a control module 102 that configures one or more configurable devices 104 upon boot up. The configurable devices 104 may include switches 106 or modules 108, as shown, or other configurable devices. The control module 102 is in communication with a first memory 110, a second memory 112 and a third memory 114, which are shown as a flash memory, a ROM and a RAM, respectively. The third memory 114 is used at runtime and may be referred to as runtime RAM. The control module 102 communicates with a communication network/Internet, such as that shown in FIG. 3 via a network interface 115. The control module 102 may also communicate with a serial interface 116.

The first memory 110 may include a single flash memory IC and may be segmented. A first segment 120 includes a full image file 122 that is similar to the full image file 22. A second segment 124 includes a partial image file 126 that is similar to the partial image file 24. A third segment 128 includes a configuration database 130.

The full image file 122 includes managing software 132 and application software 134. The managing software 132 uses information contained in the configuration database 130 to configure the configurable devices 104. The configuration database 130 contains the initial states, settings, and response attributes associated with the configurable devices 104. The managing software 132 pulls information in the configuration database 130 to set and provide proper performance of the configurable devices 104.

The application software 134 may include a user interface to allow a user to alter settings or operation of the network device 100. The application software 134 allows the control module 102 to indicate the status of the network device 100 and/or the status of devices connected thereto. The application software 134 also includes web server information. A user may connect to the network device 100 via a web browser to obtain status information. The application software 134 further includes information for connecting to and communicating with other devices in or outside the same network as the network device 100. The application software 134 may include IEEE and interactive electronic technical specification (IETS) protocols for communicating, switching and routing signals to other network devices.

Like the partial image file 24, the partial image file 126 includes some of the information that is contained in the full image file 122. The partial image file 126 is sized to fit in the first memory 110 and to provide enough functionality to allow remote file loading. The partial image file 126 includes information that allows for IP addressing and/or the ability for the network device 100 to be remotely contacted and that allows file transfer to the network device 100. The file transfer information at a minimum allows for the transfer of a current, acceptable, compatible and/or updated image file to replace the full image file 122. The full image file 122 may include a partial web-server with limited functionality. The partial web-server has enough functionality to allow a graphical user interface (GUI) based file transfer initiation.

The partial image file 126 may include information to allow the control module 102 to read enough from the configuration database 130 to maintain a current Spanning tree. This prevents disturbing a network in which the network device 100 is installed. As an alternative, on switches that have the ability, i.e. that have Access-Control List (ACL) ability, Spanning tree protocol (STP) settings may be ignored and ACL's that only allow traffic to and/or from switch control may be invoked. This is performed such that the network is protected, not by having a correct STP setting, but by treating the world (other network switches) as a single system with many interfaces and by not providing any frame-forwarding. This alternative provides increased safety, but until a fixed image is sent, a portion of the network around the switch is out of service. However, by implementing STP settings and by treating the world (other network switches) like a simple L2 switch, connectivity is provided to clients while the switch management is out of service. The partial image file 126 may further include other information, depending on availability of memory space in the first memory 110.

The first memory 110 includes non-volatile memory, such as flash memory, that may be electrically erased and reprogrammed. The first memory 110 may be of various sizes and segmented differently depending upon the application. In one embodiment, the first memory 110 is segmented such that the first segment 120 is allocated approximately ⅝, the second segment 124 is allocated approximately 3/16, and the third segment 128 is allocated approximately 3/16 of the total memory space or the first memory 110. Thus, if the first memory 110 has 8 megabytes of memory space available, a 5 megabyte portion and two 1.5 megabyte portions are allocated to the segments 120, 124, 128, respectively. Although the first memory 110 is described as a flash memory, it may be in the form of some other suitable non-volatile memory that stores similar information.

The second memory 112 stores boot loading software 140 and validity check software 142. The boot loading software 140 is used by the control module 102 to pull the full image file 122 or the partial image file 126 from the first memory 110, to uncompress the image file, to load the uncompressed image file into the third memory 114, and to execute the loaded image file.

The validity check software 142 is used to determine whether the full image file 122 and/or the partial image file 126 is correct or has an error. The validity check software 142 is also used to determine whether an error is corrected. The validity check software 142 may perform a cyclic redundancy check (CRC) to check if bits in the image file of concern are correct. The CRC provides a binary result that may be compared with a stored value. Based on the comparison an error is detected. The image files 122, 126 may have a header with identification/attribute numbers, referred to as a "magic cookie". The validity check software 142 based on the magic cookie may determine whether the image file is proper for the current application, may determine the software associated with the image file and may determine the version of the image file. Based on the information, the control module 102 is able to determine whether the image file is appropriate and/or compatible. The validity check is performed when loading either of the image files 122, 126.

The serial interface 116 may be a RETMA standard (RS)-232 serial interface, a universal serial port (USB) interface, or some other suitable interface. The serial interface 116 allows for a hard-wired connection directly between the network device 100 and a manufacturer download system or the Internet. The serial interface 116 may be used to upload a current, operable, compatible and/or updated image file. This may be used to replace the full image file 122 and/or the partial image file 126.

Figure 3:
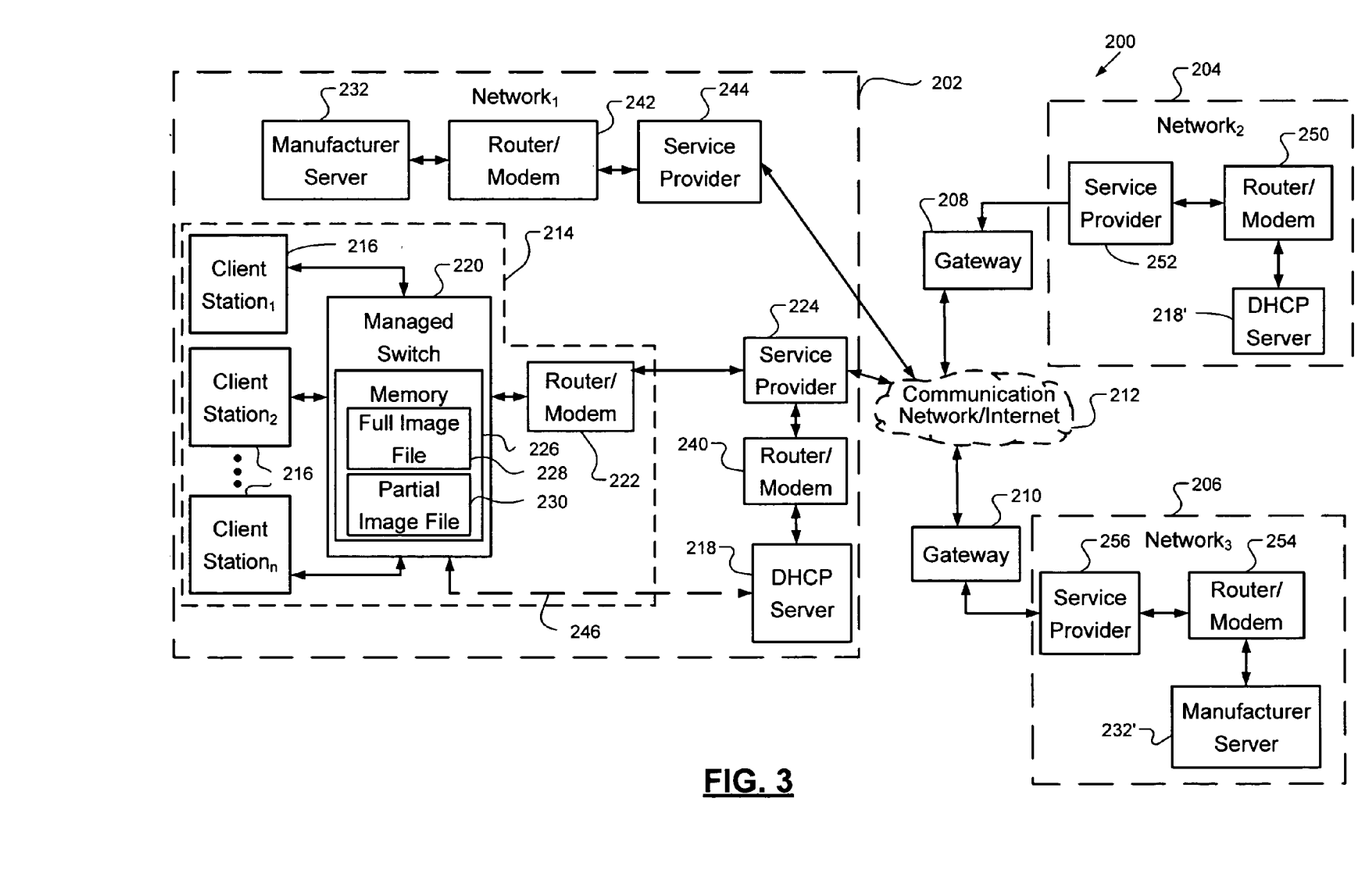
FIG. 3 is a functional block diagram illustrating a multi-protocol network incorporating a managed switch according to an embodiment of the present disclosure.

Referring to FIG. 3, a functional block diagram illustrating a multi-protocol communication network 200 is shown. For the example embodiment provided, three protocol specific networks 202, 204, 206 are in communication with each other via gateways 208, 210 and a communication network 212, such as the Internet. The networks 202, 204, 206 may be or include wide area networks (WANs) and/or local area networks (LANS), such as the LAN 214. The networks 202, 204, 206 may implement different protocols for wired and/or wireless communication and/or follow Institute of Electrical and Electronic Engineers (IEEE) standards, such as 802.11, 802.11a, 802.11b, 802.11g, 802.11h, 802.11n, 802.16, and 802.20. The networks 202, 204, 206 may be transmission control protocol (TCP)/Internet protocol (IP) based networks, internetwork packet exchange (IPX)/sequenced packet exchange (SPX) based networks, or other communication based networks. The gateways 208, 210 may have translators, impedance matching devices, rate converters, isolators, mapping and conversion devices, and other items used for interfacing between the networks 202, 204, 206.

The first network 202 includes multiple client stations 216, which may be in communication with each other, the communication network/Internet 212 and a dynamic host configuration protocol (DHCP) server 218, as well as other network connected devices. A managed switch 220, a router/modem 222, and a service provider 224 are connected between the client stations 216 and the communication network/Internet 212 to facilitate such communication. The client stations 216 are in communication with the managed switch 220, which in turn is in communication with the router/modem 222. Although shown as hard-wired to the managed switch 220, the client stations 216 may wirelessly communicate with the managed switch 220. The client stations 216 may wirelessly communicate with the switch 220 using Bluetooth wireless communication or the like. The router/modem 222 is connected to the service provider 224, which provides access to the communication network/Internet 212.

The managed switch 220 serves as an efficient central point for the LAN 214. This allows for the exchange of information between various devices in the LAN 214. The devices may include the client stations 216, as well as computers, servers, routers, printers, firewalls and other devices within the LAN 214. The managed switch 220 has an assigned or associated IP address that allows for remote monitoring, administrating, and configuring of areas of the LAN 214 and the functions of the switch 220. The administration and configuration may be done through a web browser. The managed switch 220 may collect and report information about the performance of the LAN 214, including problems on specific ports and the workstations or servers attached. The managed switch 220 may also provide additional functionality, such as the ability to set up broadcast domains within the LAN 214.

The managed switch 220 includes one or more memories 226 that have a full image file 228 and a partial image file 230. The full image file 228 contains boot information that is used in the boot up of the managed switch 220. The partial image file 230 is used when there is an error with the full image file 228 and thus is used as a backup to assure boot capability of the managed switch 220. In other words, the partial image file 230 contains a portion of the content that is within the full image file 228. The partial image file 230 is a content scaled down version of the full image file 228. The partial image file 230 allows for the managed switch 220 to be remotely reachable and allows for the downloading of a current, acceptable, compatible and/or updated boot image file from, for example, a manufacturer server 232. The manufacturer server 232 may be a central office or a repair center. In one embodiment, the partial image file 230 includes the code needed to remotely communicate and perform a file transfer. However, the partial image file 230 may contain additional information, as will become more apparent in view of the below description. The full image file 228 and the partial image file 230 are described in further detail below.

The managed switch 220 is shown for example purposes only; other electronic communication network devices may also have a full and/or partial image file and other associated elements and characteristics to assure boot ability thereof. Such elements and characteristics are described below with respect to the communication network device of FIG. 2. Some examples of such other electronic communication network devices are a router, a hub, a computer and the like, which include or execute a boot program.

As shown, the DHCP server 218 and the manufacturer server 232 are in the same network as the managed switch 220. In use, the DHCP server 218 provides an IP address to the client stations 216 and/or the managed switch 220. The manufacturer server 232 provides image files to the managed switch 220. The DHCP server 218 is connected to the communication network/Internet 212 via a designated router/modem 240 and the service provider 224. The manufacturer server 232 may be similarly connected to the communication network/Internet 212 via a designated router/modem 242 and a service provider 244. As an alternative, the DHCP server 218 and/or the manufacturer server 232 may be connected to the managed switch 220. The dashed line 246, illustrates a connection between the DHCP server 218 and the managed switch 220.

The DHCP server 218 and the manufacturer server 232 may be located in different networks as the managed switch 220. As illustrative examples, the second network 204 and third network 206 are provided to show the DHCP server and manufacturer server, respectively designated 218' and 232', in separate and/or different networks. The second network 204 includes the DHCP server 218', which is in communication with the gateway 208 via a router/modem 250 and a service provider 252. The third network 206 includes the manufacturer server 232' that is in communication with the gateway 210 via a router/modem 254 and a service provider 256.

The DHCP server 232 provides dynamic addressing and allows a requesting device to have a different IP address each time it connects to the communication network/Internet 212. Although a DHCP server is shown and used to generate IP addresses, IP addresses may be generated using other known techniques. For example, an IP address may be manually assigned, created by a user, or internally generated by the managed switch 220 or other network device of interest. As yet another technique, a default IP address, which is associated with a gateway, may also be stored and used to obtain an IP address. The managed switch 220 or other network device may relay, broadcast, or communicate with a DHCP server through a gateway using the default IP address. As such, the managed switch 220 may obtain an IP address in the same subnetwork as the default gateway. An internally generated address or a default address may be used, for example, when the managed switch 220 is not in routable range, such as when it is outside a layer-2 domain of a system. Layer-2 refers to a data link layer of an open system interconnections (OSI) model. The OSI model is known to one skilled in the art and thus is not described in detail, but rather is incorporated herein by reference in its entirety. See International Organization of Standardization (ISO) standard 7498-1:1994 or Hubert Zimmermann, IEEE Transactions on Communications, vol. 28, no. 4, April 1980, pp. 425-432 for a description of the OSI model.

In operation, the managed switch 220 may broadcast a layer-2 domain IP address request signal directly to the DHCP server 218, or relay the signal via the gateway 208 to the DHCP server 218' or other appropriate server. As an alternative the DHCP server 218, 218' may scan the LAN 214 for a device to locate the managed switch 220 or network device waiting to be uploaded. When a device is located that has an IP address that is in a set of predetermined possible IP addresses, a new IP address may be assigned. As an example, there may be 254 possible IP addresses within a subnetwork that are scanned. More than one network and subnetwork may be included in the multi-protocol communication network 200.

Figure 4:
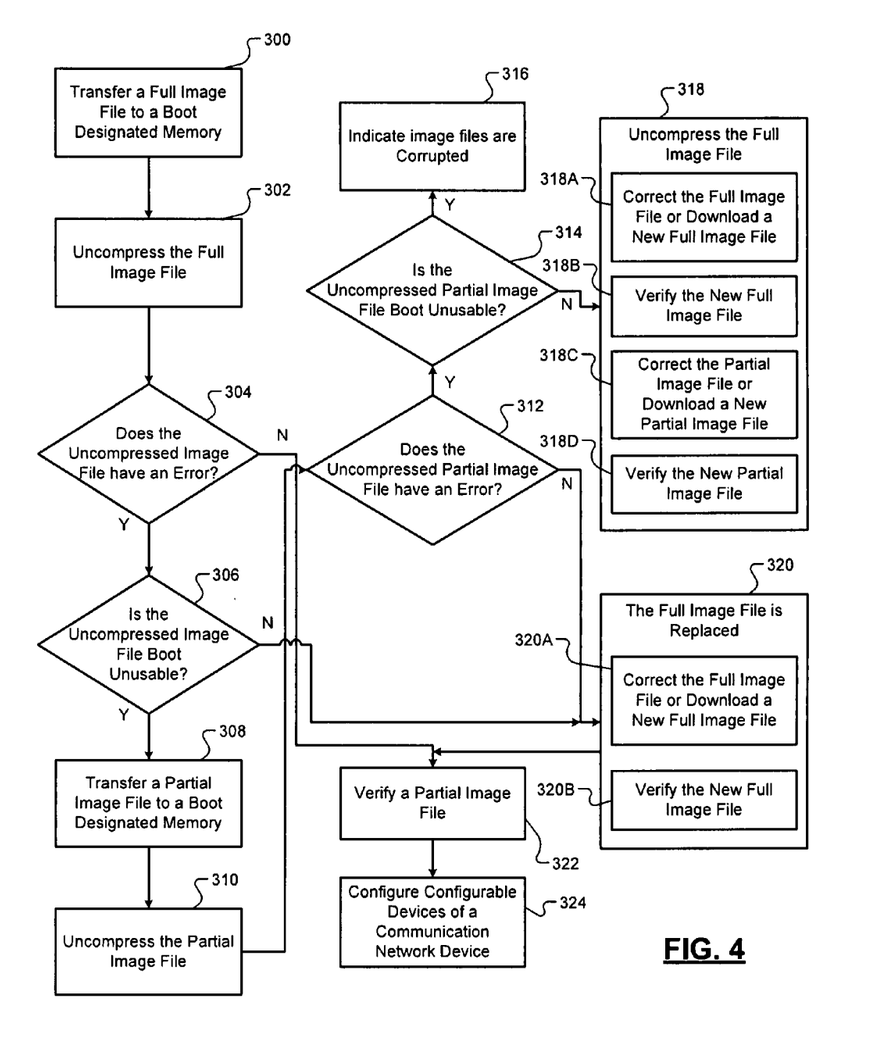
FIG. 4 is a logic flow diagram illustrating a method of booting a network device.

Referring now to FIG. 4, a logic flow diagram illustrating a method of booting a communication network device is shown. Although the following steps are described with respect to the embodiments of FIGS. 1-2, they may be easily modified to apply to other embodiment of the present invention.

In step 300, a control module transfers a full image file, such as one of the full image files 122, 228, from a first memory to a third memory via boot loading software stored in a second memory. The memories may be the memories 16, 18, 20 or 110, 112, 114, respectively. In step 302, the control module uncompresses the full image file in the third memory to generate an uncompressed full image file or a full run-time version.

In step 304, the control module validates the uncompressed image file. The control module determines whether the uncompressed full image file has an error. An error may refer to an incompatible file, a corrupted file, an incomplete file, a file that has a correctable flaw, a file that is an incorrect version, a file that is outdated, etc. When an error exists the control module proceeds to step 306, otherwise it proceeds to step 322. In step 306, when the uncompressed full image file has an error, the control module determines whether the uncompressed full image file is incomplete, corrupted or boot unusable and thus incapable of being used to download an image file. When the uncompressed full image file is unusable the control module proceeds to step 308, otherwise to step 320.

In step 308, the control module transfers a partial image file, such as one of the partial image files 126, 230, from the first memory to the third memory also via the boot loading software. In step 310, the control module uncompresses the partial image file to generate an uncompressed partial image file or a partial run-time version.

In step 312, the control module validates the uncompressed partial image file. The control module determines whether the uncompressed partial image file has an error. When an error exists the control module proceeds to step 314, otherwise it proceeds to step 320. In step 314, the control module determines whether the uncompressed partial image file is unusable. When the uncompressed partial image file is unusable the control module proceeds to step 316, otherwise to step 318. In step 316, the control module may indicate that the image files are incomplete, incompatible, corrupted or unusable and that a serial download may be needed to replace the image files. An indication signal may be generated or provided to a user.

In step 318, the full image file and the partial image file are replaced. In step 318A, when the uncompressed partial image file is usable, the control module may correct the error associated with the full image file or download a correct, operable, compatible, updated or new full image file. In step 318B, the control module verifies the new full image file. The control module repeats steps 318A and 318B until a proper downloaded full image file is obtained, until a predetermined period of time has elapsed, or until a predetermined number of iterations have been performed. In step 318C, following the download and verification of the full image file, the control module may correct the error associated with the partial image file or download a new partial image file. In step 318D, the control module similarly verifies the new partial image file. Upon completion of step 318, step 324 is performed.

In step 320, the full image file is corrected or replaced. In step 320A, the control module corrects the full image file or downloads a new full image file. In step 320B, the control module verifies the downloaded full image file. This verification is similar to that performed in step 318B.

In step 322, the control module verifies the partial image file currently stored in the first memory, like in steps 312-318, and may correct or replace the partial image file when an error exists.

In step 324, the control module configures designated configurable devices, such the configurable devices 14, 104, via the information contained within the ultimately uncompressed and validated full image file.

Note that the above disclosed embodiments are not exhaustive. The above-described partial image file may be considered as a half image file, which allows for a remote upgrade over a network. As another example embodiment, a quarter image file may be used. The quarter image file may allow for local-only connection, but over an Ethernet/network connection, by using a fixed private-range (non-routable) Internet protocol (IP) address (e.g. 192.168.x.y). A user may manually set a personal computer (PC) to an address in the same subnet and use this as a single-purpose, one-time network setup to send just an upgrade image using file transfer protocol (FTP), as done in a normal case.

The quarter image case may be more cumbersome than the full image and half image cases, but is better than Xmodem-over-serial, and may be performed by an end user. The quarter image case provides a yet smaller memory footprint. For safety, during a quarter image case, the operating system may only support a "traffic-to-me" model, and all other feature/services may not be active.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A switch comprising:
   a first memory that comprises
      a first segment configured to store a first image file containing (i) boot information to configure the switch, and (ii) code to coordinate frame-forwarding of switch-to-switch traffic, and
      a second segment configured to store a second image file that is separate from the first image file, wherein the second image file contains code to permit the switch to remotely load a file, and wherein the second image file does not include the code to coordinate frame-forwarding of switch-to-switch traffic;
   a second memory configured to store a boot program;
   a third memory; and
   a control module configured to boot up the switch by executing the boot program stored in the second memory, wherein in response to the boot program being executed,
      the control module is configured to (i) transfer the first image file from the first segment of the first memory to the third memory, and (ii) determine whether there is an error associated with the first image file transferred to the third memory,
      in response to the control module not detecting an error with the first image file transferred to the third memory, the control module is configured to (i) configure the switch in accordance with the boot information contained in the first image file, and (ii) configure the switch to perform frame-forwarding of switch-to-switch traffic in accordance with the code to coordinate frame-forwarding of switch-to-switch traffic,
      in response to the control module detecting an error with the first image file transferred to the third memory and determining that the first image file is unusable, the control module is configured to (i) transfer the second image file from the second segment of the first memory to the third memory, and (ii) determine whether there is an error associated with the second image file transferred to the third memory,
      in response to the control module not detecting an error with the second image file transferred to the third memory, the control module is configured to replace the first image file with an updated image file received by the switch, wherein the updated image file is received by the switch in accordance with the code to permit the switch to remotely load a file contained the second image file, and wherein prior to the switch being configured in accordance with the updated image file, the switch is configured to (i) only allow traffic to and/or from the switch and (ii) not perform frame-forwarding of switch-to-switch traffic due to the second image file not including the code to coordinate frame-forwarding of switch-to-switch traffic, and
      in response to the control module detecting an error with the second image file transferred to the third memory and determining that the second image file is unusable, the control module is configured to indicate that each of the first image file and the second image file is unusable.

2. The switch of claim 1, wherein the first memory ides comprises a flash memory.

3. The switch of claim 1, wherein the first segment of the first memory and the second segment of the first memory are implemented by an integrated circuit.

4. The switch of claim 1, wherein the code to permit the switch to remotely load a file comprises:
Internet protocol (IP) address accessing code and file transfer protocol code.

5. The switch of claim 1, wherein the code to permit the switch to remotely load a file comprises remote file transfer information.

6. The switch of claim 1, wherein:
the first memory comprises a database; and
the control module is configured to set at least one of an initial state or an initial setting of a device associated with the switch based on the database.

7. The switch of claim 1, wherein the control module is configured to receive an Internet protocol (IP) address via at least one of the second image file or a dynamic host configuration protocol (DHCP) server.

8. The switch of claim 1, wherein the control module is configured to (i) generate an Internet protocol (IP) address request signal based on the second image file, and (ii) receive an IP address from a dynamic host configuration protocol (DHCP) server based on the IP address request signal.

9. The switch of claim 8, wherein the control module stores a default gateway identifier, and sends the IP address request signal based on the default gateway identifier.

10. The switch of claim 1, wherein the control module is configured to:
store a default Internet protocol (IP) address associated with a default gateway; and
receive an updated image file via the default IP address.

11. The switch of claim 1, wherein the second memory comprises electrically erasable programmable read only memory.

12. The switch of claim 1, wherein the third memory comprises random access memory.

13. The switch of claim 1, further comprising a serial interface,
wherein in response to the control module indicating that each of the first image file and the second image file is unusable, the control module is configured to receive an updated image file via the serial interface.

14. The switch of claim 1, further comprising a network interface,
wherein in response to the control module indicating that each of the first image file and the second image file is unusable, the control module is configured to receive an updated image file via the network interface.

15. The switch of claim 1, wherein:
the control module is configured to (i) verify the first image file based on a first header of the first image file, and (ii) verify the second image file based on a second header of the second image file;
the first header includes a first identification number and a first attribute number;
the second header includes a second identification number and a second attribute number;
the first identification number and the first attribute number identify an application and a version of the first image file; and
the second identification number and the second attribute number identify an application and a version of the second image file.

16. The switch of claim 1, wherein:
the first memory is configured to store a quarter image file, wherein the quarter image file (i) is smaller than the second image file and (ii) has fewer features than the second image file; and
the controller is configured to execute the quarter image file in response to each of the first image file and the second image file being unusable.

17. The switch of claim 16, wherein the quarter image file permits local-only connection of the switch by using a fixed private-range Internet protocol address, wherein the fixed private-range Internet protocol address is non-routable.

18. A method of operating a switch, the method comprising:
storing a first image file in a first segment of a first memory, wherein the first image file contains (i) boot information to configure the switch, and (ii) code to coordinate frame-forwarding of switch-to-switch traffic;
storing a second image file in a second segment of the first memory, wherein the second image file is separate from the first image file, and wherein the second image file contains code to permit the switch to remotely load a file, and wherein the second image file does not include the code to coordinate frame-forwarding of switch-to-switch traffic;
storing a boot program in a second memory; and
booting up the switch by executing the boot program stored in the second memory, wherein in response to the boot program being executed, the method further includes
transferring the first image file from the first segment of the first memory to a third memory, and determining whether there is an error associated with the first image file transferred to the third memory,
in response to not detecting an error with the first image file transferred to the third memory, (i) configuring the switch in accordance with the boot information contained in the first image file, and (ii) configuring the switch to perform frame-forwarding of switch-to-switch traffic in accordance with the code to coordinate frame-forwarding of switch-to-switch traffic,
in response to detecting an error with the first image file transferred to the third memory and determining that the first image file is unusable, (i) transferring the second image file from the second segment of the first memory to the third memory, and (ii) determining whether there is an error associated with the second image file transferred to the third memory,
in response to not detecting an error with the second image file transferred to the third memory, replacing the first image file with an updated image file received by the switch, wherein the updated image file is received by the switch in accordance with the code to permit the switch to remotely load a file contained the second image file, and wherein prior to the switch being configured in accordance with the updated image file, (i) only allowing traffic to and/or from the switch and (ii) not performing frame-forwarding of switch-to-switch traffic in accordance with the second image file not including the code to coordinate frame-forwarding of switch-to-switch traffic, and
in response to detecting an error with the second image file transferred to the third memory and determining that the second image file is unusable, indicating that each of the first image file and the second image file is unusable.

19. The method of claim 18, wherein the first memory comprises a flash memory.

20. The method of claim 18, wherein the code to permit the switch to remotely load a file comprises Internet protocol (IP) address accessing code and file transfer protocol code.

21. The method of claim 18, wherein the code to permit the switch to remotely load a file comprises remote file transfer information.

22. The method of claim 18, wherein configuring the switch in accordance with the boot information contained in the first image file comprises:
configuring a device of the switch based on a database in the first memory.

23. The method of claim 18, further comprising receiving an Internet protocol (IP) address via at least one of the second image file or a dynamic host configuration protocol (DHCP) server.

24. The method of claim 18, further comprising:
generating an Internet protocol (IP) address request signal based on the second image file; and
receiving an IP address from a dynamic host configuration protocol (DHCP) server based on the IP address request signal.

25. The method of claim 24, further comprising:
storing a default gateway identifier; and
sending the IP address request signal based on the default gateway identifier.

26. The method of claim 18, further comprising:
storing a default Internet protocol (IP) address associated with a default gateway; and
receiving an updated image file via the default IP address.

27. The method of claim 18, wherein storing the second image file in the third memory comprises uncompressing the second image file.

28. The method of claim 18, further comprising receiving an updated image file via a serial interface of the switch in response to each of the first image file and the second image file being unusable.

29. The method of claim 18, further comprising receiving an updated image file via a network interface of the switch in response to each of the first image file and the second image file being unusable.

30. A network comprising:
the switch of claim 1; and
a plurality of client stations that access a router via the switch.

31. The network of claim 30, wherein the client stations communicate wirelessly with the switch.

32. The network of claim 30, wherein the control module is configured to receive an updated image file from a manufacturer server while executing the boot program using the second image file, wherein the updated full image file is transmitted from the manufacturer server to the switch via the router.

* * * * *